Patented Aug. 10, 1937

2,089,845

UNITED STATES PATENT OFFICE 2,089,845

DENTAL COMPOUND

Malcolm W. Atkins, Worcester, Mass.

No Drawing. Application May 4, 1932,
Serial No. 609,273

3 Claims. (Cl. 167—93)

The present invention relates to a dental compound adapted for use as a "pack" to prevent decay and formation of cavities in the teeth and also to minimize and reduce sensitivity of the teeth, preparatory to dental work thereon.

The invention resides in the provision of a substance, consisting principally of a magnesium salt in such form that intimate and prolonged application thereof to the teeth, particularly in the areas that are subject to decay and excessive acidity, is, for the first time, made possible.

It is known of course that many magnesium compounds are corrective of acid conditions,—the familiar milk of magnesia (hydrate of magnesia) a medical preparation being widely used as a neutralizing agent for acid conditions of the stomach. Dentists have long recognized that milk of magnesia can be used as a temporary corrective of acid conditions in the mouth,—which conditions are known to greatly increase the sensitivity of the teeth. In fact, a tooth paste composed in part of milk of magnesia is available commercially for use in brushing the teeth, and its alleged corrective action for acid conditions of the mouth and teeth is widely advertised.

The fact remains, however, that neither the liquid medicinal milk of magnesia, nor the tooth paste that incorporates same as one of its ingredients, is susceptible of anything more than a mere transitory or fleeting use, as a corrective for excessive conditions of acidity (and hence extreme sensitiveness) in and around the teeth. It is obviously not practicable for a person to hold the liquid milk of magnesia in the mouth for more than a few minutes at a time,—and when the tooth paste containing such milk of magnesia is applied in any considerable quantity to the teeth or to the gums, or to both, the same difficulty is encountered, because invariably the saliva in the mouth will quickly soften and partially dissolve this paste, thereby compelling the user either to swallow it, or spit it out, within a few minutes after its application.

I have discovered that no substantial benefit results from the use of a magnesium compound or salt in the mouth and on the teeth unless the same be maintained in intimate contact with the teeth and gums for a period of several hours,— for example during the night, while the user is sleeping. Research has proven that it is during sleep that the acid in the saliva is most active in causing tooth decay. According to my invention the magnesium salt is concentrated in a substance or packing compound of semi-solid plastic character; this compound may consist for example of powdered magnesium carbonate in intimate mixture with a non-soluble semi-fluid binder, such as heavy mineral oil; in this mixture may be included, if desired, a suitable emollient. Enough magnesium carbonate or other magnesium salt is used to give the compound the consistency substantially of putty; in this form the substance or compound can, with the finger tip be applied, by pressing and packing to the teeth and gums and into the spaces between the teeth, just before the user retires at night. So applied, the concentrated magnesium compound will remain in intimate contact with the areas of application, in the absence of discomfort to the user, until it is removed in the morning,—the compound being dense enough to resist effectually the removing action of the saliva in the user's mouth, but allowing enough penetration of moisture to promote the neutralizing action of the magnesium carbonate or other magnesium salt on the tooth and gum areas that are subject to decay or to excessive acidity. As previously stated, the magnesium carbonate, or equivalent alkaline substance, is the active ingredient of the compound,— there being added to this substance only enough of the mineral oil or equivalent insoluble vehicle (with or without the emollient, as desired) to make the compound a heavy paste, of putty-like consistency or density.

When used as above described, the compound of my invention affords effective and prolonged neutralization of the acids, always present in the mouth, that attack the enamel of the teeth and cause decay of the tooth structure. Furthermore, it has been amply demonstrated that such use of my dental compound reduces materially the sensitiveness of decayed teeth and diseased gums, thereby facilitating greatly the performance of the dental work required to correct such conditions.

I make no claim broadly to a magnesium compound, for dental use, in the known liquid or soluble paste forms, but what I do claim and desire to secure by Letters Patent of the United States is:—

1. A protective ointment for the teeth comprising an alkaline substance for neutralizing the acidity of the mouth mixed with a substantially insoluble base or vehicle to form a plastic semi-solid mass, said ointment being adapted to remain in prolonged and intimate contact with the teeth when applied.

2. A dental preparation for application as a protective coating on teeth and gums, and comprising magnesium carbonate in intimate admixture with relatively heavy mineral oil to form a plastic semi-solid mass which, on account of the insolubility of such mineral oil in saliva, is adapted to remain in prolonged and intimate contact with the teeth and gums when applied thereto.

3. A dental preparation for application to the teeth and gums as a neutralizer of mouth acids, and comprising a powdered alkaline magnesium compound mixed with a relatively heavy fluid base or vehicle which is resistant to the thinning or dissolving action of saliva, to form a paste adapted to remain in prolonged contact with the teeth and gums when applied thereto.

MALCOLM W. ATKINS.